United States Patent
Wefringhaus et al.

(10) Patent No.: US 6,253,505 B1
(45) Date of Patent: *Jul. 3, 2001

(54) IRON-OXIDE-CONTAINING ONE OR TWO-COMPONENT POLYURETHANE PAINT FOR COATING ELASTOMERS, ITS PRODUCTION AND USE

(75) Inventors: Rainer Wefringhaus, Hilden; Richard Hemel, Monheim, both of (DE)

(73) Assignee: Henkel Kommanditgesellschaft auf Aktien, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,456

(22) PCT Filed: May 24, 1996

(86) PCT No.: PCT/EP96/02245

§ 371 Date: Dec. 2, 1997

§ 102(e) Date: Dec. 2, 1997

(87) PCT Pub. No.: WO96/38497

PCT Pub. Date: Dec. 5, 1996

(30) Foreign Application Priority Data

Jun. 2, 1995 (DE) ............................................. 195 20 278

(51) Int. Cl.[7] .............................. E06B 3/00; E06B 3/32; B60J 1/10; B60J 1/12
(52) U.S. Cl. ................. 52/204.5; 52/204.51; 52/204.53; 296/146.15; 296/146.16; 296/190.1; 296/201; 427/372.2; 427/385.5; 427/393.5; 524/430; 524/431; 524/589; 524/590
(58) Field of Search ..................... 524/589, 590, 524/430, 431; 427/372.2, 385.5, 393.5; 52/204.5, 204.51, 204.53; 296/190.1, 201, 146.15, 146.16

(56) References Cited

U.S. PATENT DOCUMENTS

| | | |
|---|---|---|
| 4,572,871 | 2/1986 | Mabuchi et al. .................. 428/423.1 |
| 4,572,875 | 2/1986 | Gutshall ............................... 428/585 |
| 5,441,771 * | 8/1995 | Seltmann et al. ..................... 427/386 |

FOREIGN PATENT DOCUMENTS

| | | |
|---|---|---|
| 12 69 180 | 9/1964 | (DE) . |
| 1269180 * | 5/1968 | (DE) . |
| 33 35 150 | 7/1984 | (DE) . |
| 4227935A1 * | 2/1994 | (DE) . |
| 42 27 935 | 2/1994 | (DE) . |
| 0 251 334 | 1/1988 | (EP) . |
| 0 293 084 | 11/1988 | (EP) . |
| 0 309 286 | 3/1989 | (EP) . |
| 0 375 923 | 7/1990 | (EP) . |
| 0 585 167 | 3/1994 | (EP) . |
| 1 342 189 | 9/1962 | (FR) . |
| 1342189 * | 9/1963 | (FR) . |
| 2-023519 | 1/1990 | (JP) . |
| 1 571 662 | 6/1990 | (SU) . |

OTHER PUBLICATIONS

G. Glement, Kautschuk und Gummi, Kunststoffe, vol. 23 (8): 375–78 (1970).

* cited by examiner

*Primary Examiner*—Patrick D. Niland
(74) *Attorney, Agent, or Firm*—Wayne C. Jaeschke; Stephen D. Harper

(57) ABSTRACT

The invention relates to one- or two-component polyurethane lacquers for coating elastomers containing polyurethane prepolymers with an average of two or more isocyanate groups per molecule which have been prepared by mixing alcohols having a functionality of two or higher with an excess of isocyanate compounds having a functionality of two or higher and solvents, characterized in that a compound containing iron oxide is added in an extremely large quantity to improve surface slip, and to the production and use of such one- or two-component polyurethane lacquers.

22 Claims, No Drawings

IRON-OXIDE-CONTAINING ONE OR TWO-COMPONENT POLYURETHANE PAINT FOR COATING ELASTOMERS, ITS PRODUCTION AND USE

BACKGROUND OF THE INVENTION

This invention relates to a one- or two-component polyurethane lacquer for coating elastomers, to its production and to its use.

There are a number of industrial applications, including for example the sealing of window compartments for moving glass parts in automobiles, which require elastomers having improved surface slip with respect to glass in addition to their other well-known favourable properties. To achieve this, it has hitherto been possible to coat the elastomer part with a lacquer containing fixedly joined spacers of hard materials. The spacers used include particles of glass, aluminium, polypropylene or polyvinyl chloride. A corresponding process is described, for example, in DE-C 33 35 150.

A basic disadvantage is that the peak-and-trough structure of the spacer-containing lacquer does not provide for optimal sealing so that head winds can penetrate and cause noise which is undesirable. Another disadvantage is that the surface of the elastomer parts thus lacquered does not form an optically smooth glossy surface, but instead looks like fine emery cloth.

Another process described in U.S. Pat. No. 4,572,875 and in U.S. Pat. No. 4,572,871 comprises adding silicones or fluorinated resins to the anti-friction lacquer. Corresponding lacquers have the disadvantage that, under extreme weather conditions, such as heat, cold, wind and rain, to which the elastomer part is normally exposed, the added silicones and fluorinated resins are removed from the lacquer which leads to a reduction in the surface slip of the elastomer part with respect to glass and is undesirable. A further disadvantage is that the silicones are oils which are known to act as release agents.

In view of their characteristic properties, these release agents are carrier over relatively easily and can give rise to difficulties, for example at the assembly stage in the bonding and painting of bodywork parts. Accordingly, the use and consumption of non-fixed silicone oils is something which automobile manufacturers regard as undesirable.

As described in EP-A 0 293 084, silicone oils can be fixed by selecting reactive polysiloxanes which "react in" substantially irreversibly. However, the anti-friction properties of corresponding lacquers are still in need of improvement. An automobile glass window provided with an integrally moulded frame of a polymer is known from DE-OS 42 27 935 corresponding to EP-A-0 585 167. It is distinguished by the fact that the surface parts of the frame intended for contact with the window frame of the bodywork are coated with a soft-look two-component polyurethane lacquer which preferably consists of a polyol component of a solvent-containing aliphatic, hydroxyfunctional polyester and an isocyanate component of an aromatic isocyanate. In a particularly preferred embodiment, an automobile glass window is coated with a soft coating lacquer containing as its polyol component an aliphatic polyester with a solvent mixture of butyl acetate, toluene and xylene to which titanium dioxide powder and iron oxide powder are added as inorganic pigments. The isocyanate component of this lacquer is an aromatic isocyanate in a solvent mixture of toluene and xylene, the two components mentioned—mixed in a ratio of 8:1—being applied in such a way that a dry layer thickness of around 80 micrometers is formed.

One-component polyurethane lacquers have also been known to the expert on elastomers for several years, cf. for example G. Glement in Kautschuk und Gummi, Kunststoffe, Vol. 23 (1970), No. 8, pages 375–378.

Thus, EP-A-0 251 334 describes a composition prepared by reactions of hydroxyterminated perfluoropolyesters, silicocarbinols, diisocyanates and polyols in a solvent. The molar ratios are selected so that these reactive components form an NCO-terminated prepolymer which, applied as a film, cures under the effect of moisture. All four components are reacted at the same time.

EP-B 0 375 923 describes moisture-curing one-component polyurethane lacquers for coating elastomers which contain polyurethane prepolymers with—on average—two or more isocyanate groups per molecule prepared by mixing alcohols having a functionality of two or higher with an excess of isocyanate compounds having a functionality of two or higher and solvent, reactive polysiloxanes and reactive surfactants being used to improve surface slip. The surfactants used are compounds containing a perfluorinated $C_{6-12}$ alkyl radical and a non-fluorinated hydrophilic group containing a group reactive to isocyanate-terminated lacquer constituents. The lacquers in question may advantageously contain further auxiliaries, for example retarders, accelerators, stabilizers and pigments. However, they may only be applied in the form of very thin films. Moreover, it is apparent from the Examples that the films obtained only have a coefficient of friction of 0.25 to 0.4

The problem addressed by the present invention was to provide one- or two-component polyurethane lacquers for coating elastomers which would have a lower coefficient of friction than the moisture-curing one-component polyurethane lacquers for coating elastomers known from EP-A-0 375 923. In addition, the one- or two-component polyurethane lacquer according to the invention would also have other performance advantages over the prior art, i.e. high abrasion resistance and very high resistance to moisture and UV light.

DETAILED DESCRIPTION OF THE INVENTION

The solution to this problem is characterized in that a one- or two-component polyurethane lacquer contains a large amount of special auxiliary as a surface-slip improver.

Accordingly, the present invention relates to one- or two-component polyurethane lacquers for coating elastomers containing polyurethane prepolymers with an average of two or more isocyanate groups per molecule which have been prepared by mixing alcohols having a functionality of two or higher with an excess of isocyanate compounds having a functionality of two or higher and solvents, characterized in that an iron oxide is used in a quantity of 10 to 70% by weight and preferably 30 to 50% by weight, based on the solvent-containing polyurethane lacquer, to improve surface slip.

The one- or two-component polyurethane lacquers according to the invention contain polyurethane prepolymers with an average of two or more isocyanate groups per molecule as binder. The polyurethane prepolymers are prepared by mixing alcohols having a functionality of two or higher with an excess of isocyanate compounds having a functionality of two or higher. The viscosity of the products can be influenced through the quantities used. In the production of such polyurethane prepolymers for lacquers, the expert would select the ratio so that the viscosity established would enable lacquers containing 30 to 40% by weight of polyurethane prepolymer to be applied by spraying. A favourable ratio of OH to NCO is between 1:1.2 and 1:2 and preferably between 1:1.3 and 1:1.8.

The production of the polyurethane prepolymers requires above all the use of isocyanates. Suitable isocyanates are mononuclear and polynuclear aromatic diisocyanates, cycloaliphatic or linear aliphatic diisocyanates, for example 4,4'-diphenylmethane diisocyanate (MDI), hydrogenated MDI ($H_{12}$-MDI), xylene diisocyanate (XDI), tetramethyl xylene diisocyanate (TMXDI), 4,4'-diphenyl dimethylmethane diisocyanate, di- and tetraalkyl diphenylmethane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethyl cyclohexane (IPDI), chlorinated and brominated diisocyanates, tetramethoxybutane-1,4-diisocyanates, butane-1,4-diisocyanate, hexane-1,6-diisocyanate (HDI), dicyclohexylmethane diisocyanate, cyclohexane-1,4-diisocyanate, ethylene diisocyanate, isophorone diisocyanate, 1,3- and 1,4-tetramethylxylene isocyanate and tetramethylene diisocyanate.

Suitable polyfunctional hydroxyl components are functional alcohols, for example ethylene glycol, propylene glycol, neopentyl glycol, 1,4-butanediol, 1,6-hexanediol, and hydrophobic diols, such as 1,10-decanediol, 1,12-dodecanediol, 1,12-octadecanediol, dimer fatty acid diol, 1,2-octanediol, 1,2-dodecanediol, 1,2-hexadecanediol, 1,2-octadecanediol, 1,2-tetradecanediol, 2-butene-1,4-diol, 2,4, 7,9-tetramethyl-5-decine-4,7-diol, and also triols and tetraols, for example glycerol, dimethylolethane, dimethylolpropane or pentaerythritol. Particularly suitable difunctional alcohols are the condensation products of the compounds mentioned above. For example, polypropylene glycol with average molecular weights of around 100 to 10,000 and preferably in the range from 800 to 2,500 is a suitable diol. Other suitable diols are polyethylene glycols with molecular weights in the same range.

The polyurethane lacquers according to the invention also contain solvents which, in particular, promote their application. Suitable solvents are organic solvents which do not react with free isocyanate groups, i.e. hydrocarbons, ketones, esters, ethers and/or chlorinated hydrocarbons. Xylene, toluene, methyl isobutyl ketone (MIBK) and methoxypropyl acetate, for example, are particularly suitable.

The lacquers according to the invention contain iron oxides in quantities of 10% by weight to 70% by weight and preferably in quantities of 30% by weight to 50% by weight, based on the solvent-containing lacquer, to improve surface slip. The term iron oxide in the context of the present invention encompasses both naturally occurring and synthetically produced compounds mainly containing iron oxide. These include, for example, iron (II) oxide, which occurs for example in nature in the mineral wustite; compounds containing iron (III) oxide, for example haematite, maghemite, magnetite, specularite, red iron ore, and iron (III) oxide itself. Iron oxides in the context of the invention also include compounds containing iron (II, III) oxide, such as forge scale or iron hammer scale or in correspondingly hydrated form as hydrated iron oxide or rust. In addition to pure iron (II, III) oxide itself. These synthetic or natural iron oxides are preferably used in the lacquers according to the invention in particle sizes of less than 50 micrometers and preferably less than 10 micrometers.

An iron (III) oxide with a particle size of less than 50 micrometers and preferably less than 10 micrometers is preferably used as the iron oxide according to the invention.

In addition, the lacquers according to the invention may preferably contain typical auxiliaries and/or adhesion promoters, for example the fluorinated surfactants described in the above-cited EP-B-0 375 923, more especially the fluorinated nonionic surfactants described in column 3, line 48 to column 4, line 58. The lacquers according to the invention may also contain other auxiliaries, for example retarders, accelerators, stabilizers and pigments. These auxiliaries are known to the expert and are described in the literature on polyurethane lacquers. It is also known to the expert that the one-component polyurethane lacquers can be cured by moisture.

The one-component polyurethane lacquers according to the invention for coating elastomers are produced by thoroughly mixing polyurethane prepolymers containing an average of two or more isocyanate groups per molecule—prepared by mixing alcohols having a functionality of two or higher with an excess of isocyanate compounds having a functionality of two or higher and solvents, optionally auxiliaries and optionally further adhesion promoters—with compounds containing iron oxide and grinding the resulting mixture to a particle size of 50 $\mu$m and preferably to a particle size below 10 $\mu$m.

In the case of two-component polyurethane lacquers, the iron oxide is preferably added to the polyol component.

Finally, the present invention relates to the use of the polyurethane lacquers described above for coating elastomers, more especially non-polar elastomers, such as styrene-butadiene rubber, or elastomers based on ethylene/propylene/diene terpolymers (EPDM) and other flexible substrates, more especially polyurethanes, these coated elastomers having only slight friction towards glass, more especially in the form of glass windows, so that they advantageously avoid, for example, the squeaking noises which can occur with uncoated frames during travel as a result of small sliding movements between parts of the frame and the lacquered surface of the window frame.

EXAMPLE

The invention is illustrated by the following Example.

1. Composition of the Starting Materials and Their Production

Production is carried out by a two-stage process using first a grinding batch and then a stirring batch with the following compositions:

|  | [%] |
|---|---|
| Grinding batch | |
| 1. Methoxypropyl acetate | 6.47 |
| 2. Xylene | 46.18 |
| 3. Polyurethane prepolymer# | 9.06 |
| 4. Flow controller# # | 0.13 |
| 5. Silica | 0.52 |
| 6. Cellulose acetobutyrate | 1.29 |
| 7. iron(III) oxide | 36.35 |
| Total | 100.00 |
| Stirring batch | |
| 1. Polyurethane prepolymer# | 7.49 |
| 2. Grinding batch | 77.30 |
| 3. Epoxy resin | 00.80 |
| 4. Xylene | 03.91 |

-continued

|  | [%] |
|---|---|
| 5. MIBK | 10.00 |
| 6. Tosyl isocyanate | 00.50 |
| Total | 100.00 |

NCO-terminated polyurethane prepolymer (NCO content; 6.0–6.5) based on 4,4'-diphenylmethane diisocyanate and polypropylene glycol
#Alkyd resin/lecithin mixture.

The grinding batch is prepared by weighing in the abovementioned raw materials in the listed order of the grinding batch, but initially without the iron oxide, and grinding them in a mill. Grinding is carried out at temperatures of 60 to 80° C. until the particle fineness is below 50 μm which can be measured from samples taken in the meantime. When this practice fineness has been reached, the iron (III) oxide, which generally has a particle size of 0.1 μm to 5 μm, can be added. This batch is then further ground until the total particle fineness is below 50 μm.

The stirring batch is then prepared by reacting 77.3% by weight of the grinding batch together with additional polyurethane prepolymer solvents and typical auxiliaries and additives which may be done by weighing the components in the order listed into and homogenizing them in a mixing vessel.

The one-component polyurethane lacquer thus obtained has the following characteristic data:

1. a viscosity of 95 mPas
2. a density (at 20° C.) of 1.19 g/ml
3. a solids content (90 minutes at 130° C. according to DIN 53 216 ) of 46.0%.
4. a friction coefficient of 0.14
5. a degree of gloss of 1.0 and
6. an elongation of 160%.

The characteristic data mentioned above were determined as follows:

Viscosity was measured with a Brookfield LVT viscosimeter (spindle 2, 30 r.p.m./25° C.) in accordance with DIN 53 019, Part 1, 1980 Edition.

Density was measured in accordance with DIN 51 757 (June 1992 Edition) with a spindle (Areometer) at 20° C. in a 250 ml gas jar.

The solids content was determined by measuring the dry residue in accordance with DIN 53 216 (90 minute at 130° C.).

The friction coefficient was determined as follows:

The test is used to evaluate the friction behaviour of a lacquered rubber surface towards another friction partner (for example glass) under defined conditions.

To this end, a rubber plate is coated with the lacquer, for example by spraying, and the lacquer film is subsequentially dried, for example for 10 minutes at 150° C. A 20 cm$^2$ circular area is punched out from the lacquered surface. A defined glass pane, preferably of heat-toughened safety glass, is fastened to the carriage of the surface-slip tester (for example an Erichsen Model 603) with double-sided adhesive tape and cleaned with isopropanol. The test specimen is placed with the lacquered side on the glass panel and loaded with a weight of 200 g, the so-called contact weight.

The dial gauge and weight are then connected by a tie band. The drag indicator of the dial gauge is set to "0" and the speed selector lever to 150 mm per minute so that the measurement is started. The test specimen is drawn away at a speed of 150 mm per minute and the friction force occurring is recorded by the dial gauge and a drag indicator. The friction coefficient is calculated from the quotient of the sliding friction force and the applied load as $\mu$=FR/FN.

The reflective gloss—the so-called degree of gloss—is measured by comparison with a gloss standard. To this end, 3% of catalyst (for example an organotin compound, such as di-n-butyl tin dilaurate, the product Cuvertin K3 of Henkel KgaA), is added to the thoroughly stirred lacquer, followed by intensive stirring. A degreased steel plate measuring 150 mm×70 mm is then placed on the flat substrate.

A small quantity of lacquer mixture is applied to and drawn over the plate with a coating knife in a wet film thickness of 150 μm. After airing for 3 minutes, the coated plate is placed for 8 minutes in a drying oven preheated to 80° C. and then left to cool for 5 minutes. The measuring head of a calibrated measuring instrument (for example an Erichsen Model 500 Pico-Glossmaster 60°) is placed on the test specimen and the red measuring button is depressed and held down until the indicated value remains constant. The measured values indicated—in the "gloss measurement" mode of operation—are the standardized reflector values according to DIN 67 530, ISO 2813 and ASTM-D 523.

To measure elongation, the dried and cured lacquer on a strip of rubber is stretched in a tensile testing machine until the first cracks appear in the lacquer film. The distance between two markers, which changes continually as a result of the elongation, is measured and, after conversion, gives the breaking elongation in percent.

What is claimed is:

1. A glass window assembly comprised of a glass sheet, an elastomer, and a coating between the glass sheet and the elastomer, said coating formed from a one- or two-component polyurethane lacquer consisting of
   (i) at least one polyurethane prepolymer having an average of two or more isocyanate groups per molecule, said polyurethane prepolymer prepared by reacting at least one alcohol having a functionality of two or higher with an excess of at least one isocyanate compound having a functionality of two or higher;
   (ii) from about 10 to about 70% by weight, based on the polyurethane lacquer as a whole, of at least one iron oxide, and
   (iii) at least one organic solvent unreactive with free isocyanate groups.

2. The glass window assembly of claim 1 wherein the elastomer is a nonpolar elastomer.

3. The glass window assembly of claim 2 wherein the nonpolar elastomer is selected from the group consisting of styrene-butadiene rubber and ethylene/propylene/diene terpolymers.

4. The glass window assembly of claim 2 wherein the iron oxide is selected from the group consisting of iron (II) oxides, iron (III) oxides and iron (II, III) oxides.

5. The glass window assembly of claim 1 wherein the iron oxide has a particle size less than 50 micrometers.

6. The glass window assembly of claim 1 wherein the polyurethane lacquer is additionally comprised of at least one adhesion promoter.

7. The glass window of claim 1 wherein the polyurethane lacquer is additionally comprised of at least one auxiliary selected from the group consisting of pigments, accelerators, substances for preventing bubble formation, stabilizers, flow controllers, and retarders.

8. The glass window assembly of claim 1 wherein the polyurethane lacquer is comprised of about 30 to about 50% by weight of iron oxides.

9. The glass window assembly of claim 1 wheren the glass sheet is movable.

10. A glass window assembly comprised of a nonpolar elastomer a glass sheet movable relative to the nonpolar elastomer, and a coating on the nonpolar-elastomer between the movable glass sheet and the nonpolar elastomer, said coating formed from a one- or two-component polyurethane lacquer comprised of (i) at least one polyurethane prepolymer having an average of two or more isocyanate groups per molecule and prepared by reacting at least one alcohol having a functionality of two or higher with an excess of at least one isocyanate compound having a functionality of two or higher;

(ii) from about 30 to about 50% by weight, based on the polyurethane lacquer as a whole, of at least one iron oxide having a particle size less than 50 micrometers; and (iii) at least one organic solvent unreactive with free isocyanate groups.

11. The glass window assembly of claim 10 wherein the nonpolar elastomer is selected from the group consisting of styrene-butadiene rubber and ethylene/propylene/diene terpolymers.

12. The glass window assembly of claim 10 wherein said iron oxide is selected from the group consisting of iron (II) oxides, iron (III) oxides, and iron (II, III) oxides.

13. The glass window assembly of claim 10 wherein the organic solvent is selected from the group consisting of hydrocarbons, ketones, esters, ethers and chlorinated hydrocarbons.

14. The glass window assembly of claim 10 wherein the particle size of the iron oxide is less than 10 micrometers.

15. The glass window assembly of claim 10 wherein a ratio of OH to NCO between 1:1.3 and 1:1.8 is used in mixing said alcohols and said isocyanate compounds to prepare the polyurethane prepolymer.

16. The glass window assembly of claim 10 wherein 4,4'-diphenylmethane diisocyanate is utilized as one of the isocyanate compounds.

17. The glass window of claim 10 wherein a polypropylene glycol is utilized as one of the alcohols.

18. The glass window assembly of claim 10 wherein the polyurethane lacquer is additionally comprised of at least one adhesion promoter.

19. The glass window assembly of claim 18 wherein the adhesion promoter is a fluorinated surfactant.

20. The glass window assembly of claim 10 wherein the polyurethane lacquer is additionally comprised of at least one auxiliary selected from the group consisting of retarders, accelerators, stabilizers, pigments, flow controllers, and substances for preventing bubble formation.

21. A process for producing glass window assembly wherein a surface of an elastomer is in contact with a glass sheet, wherein said process comprises, coating said surface of said elastomer, prior to placing the surface in contact with the glass sheet, with a one- or two-component polyurethane lacquer comprised of (i) at least one polyurethane prepolymer having an average of two or more isocyanate groups per molecule, prepared by reacting at least one alcohol having a functionality of two or higher with an excess of at least one isocyanate compound having a functionality of two or higher (ii) from about 10 to about 70% by weight, based on the polyurethane lacquer as a whole, of at least one iron oxide; and (iii) at least one organic solvent unreactive with free isocyanate groups.

22. A process for producing a glass window assembly wherein a surface of a nonpolar elastomer is in contact with a movable glass sheet, wherein said process comprises: coating said surface of said nonpolar elastomer, prior to placing the surface in contact with the glass sheet, with a one- or two-component polyurethane lacquer comprised of (i) at least one polyurethane prepolymer having an average of two or more isocyanate groups per molecule, prepared by reacting at least one alcohol having a functionality of two or higher with an excess of at least one isocyanate compound having a functionality of two or higher, (ii) from about 30 to about 50% by weight, based on the polyurethane lacquer as a whole, of at least one iron oxide having a particle size less than 50 micrometers, and (iii) at least one organic solvent unreactive with free isocyanate groups.

* * * * *